(12) United States Patent  (10) Patent No.: US 9,033,350 B2
Porri  (45) Date of Patent: May 19, 2015

(54) LUGGAGE SCOOTER DEVICE

(75) Inventor: Federico Porri, Rome (IT)

(73) Assignee: Federico Porri, Miami Beach, FL (US)

( * ) Notice: Subject to any disclaimer, the term of this patent is extended or adjusted under 35 U.S.C. 154(b) by 0 days.

(21) Appl. No.: 13/527,950

(22) Filed: Jun. 20, 2012

(65) Prior Publication Data

US 2013/0001911 A1 Jan. 3, 2013

(30) Foreign Application Priority Data

Jun. 29, 2011 (IE) .................. S2011/0306

(51) Int. Cl.
B62M 1/00 (2010.01)
A45C 5/14 (2006.01)
A45C 9/00 (2006.01)
B62J 9/00 (2006.01)
B62K 3/00 (2006.01)

(52) U.S. Cl.
CPC ... *B62J 9/00* (2013.01); *A45C 5/14* (2013.01); *A45C 5/146* (2013.01); *A45C 9/00* (2013.01); *A45C 2009/005* (2013.01); *B62J 9/001* (2013.01); *B62K 3/002* (2013.01)

(58) Field of Classification Search
USPC ............... 280/37, 87.042, 87.01, 87.041; 190/18 A
See application file for complete search history.

(56) References Cited

U.S. PATENT DOCUMENTS

| | | | | |
|---|---|---|---|---|
| 3,314,494 A * | 4/1967 | Weitzner | | 180/208 |
| 3,413,011 A * | 11/1968 | Weitzner | | 280/37 |
| 4,913,252 A * | 4/1990 | Bartley et al. | | 180/208 |
| 6,688,614 B2 * | 2/2004 | Hsu | | 280/37 |
| 7,837,206 B1 * | 11/2010 | Lee | | 280/37 |
| 8,201,837 B2 * | 6/2012 | Dweek | | 280/30 |
| 2004/0056442 A1 * | 3/2004 | Ostrowski et al. | | 280/87.041 |
| 2004/0094919 A1 * | 5/2004 | Roder et al. | | 280/30 |
| 2009/0315301 A1 * | 12/2009 | Athalye | | 280/651 |
| 2010/0044174 A1 * | 2/2010 | Graf Von Bismarck | | 190/18 A |
| 2010/0213680 A1 * | 8/2010 | Massara et al. | | 280/87.041 |
| 2011/0155527 A1 * | 6/2011 | Veal et al. | | 190/18 A |

* cited by examiner

Primary Examiner — J. Allen Shriver, II
Assistant Examiner — Bridget Avery

(57) ABSTRACT

Air traveling is a daily procedure, people need to move quickly within and around airports with their luggage. The invention, hereafter called "SkateTrolley ", is a luggage designed to be used as a standard trolley or the traveler can ride luggage rather than carrying it. SkateTrolley has a platform with steerable rear wheels that can be pulled out to be ridden in a skateboard manner and a pull out driving stick that drives the front wheel in a scooter way while the content of the luggage remains in place. The design is developed to minimize weight, the suitcase shell acts as a frame and maximize maneuverability thought the double steering effect.
SkateTrolley can be built in different sizes, one will fit the carryon luggage airline requirements.
Note: FIG. 5 represents the invention the most.

4 Claims, 8 Drawing Sheets

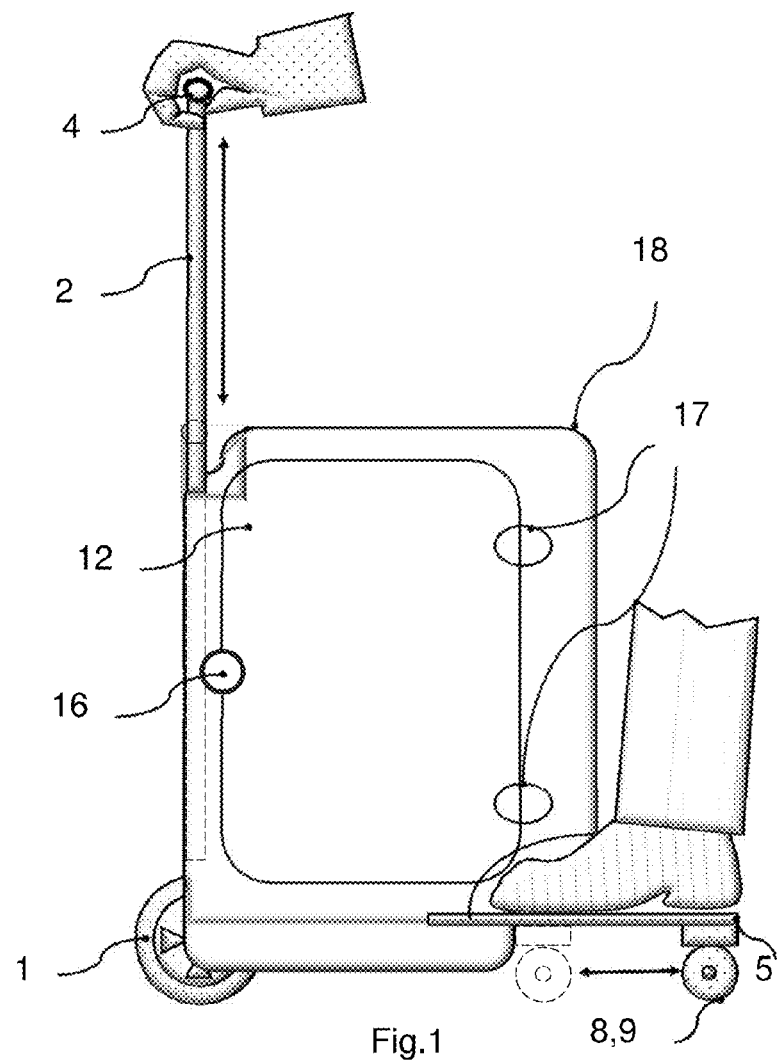
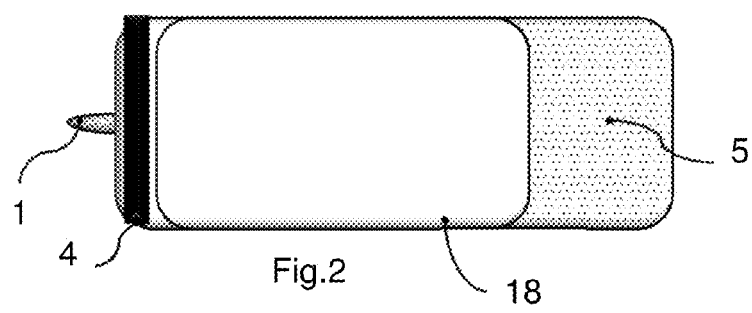

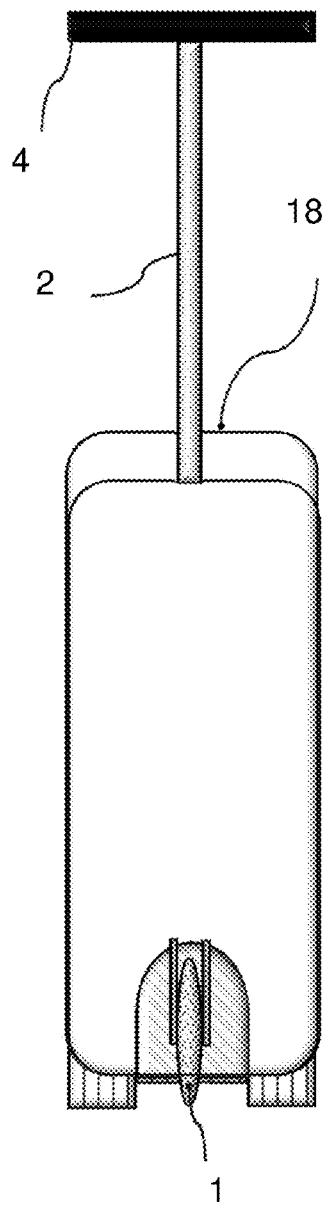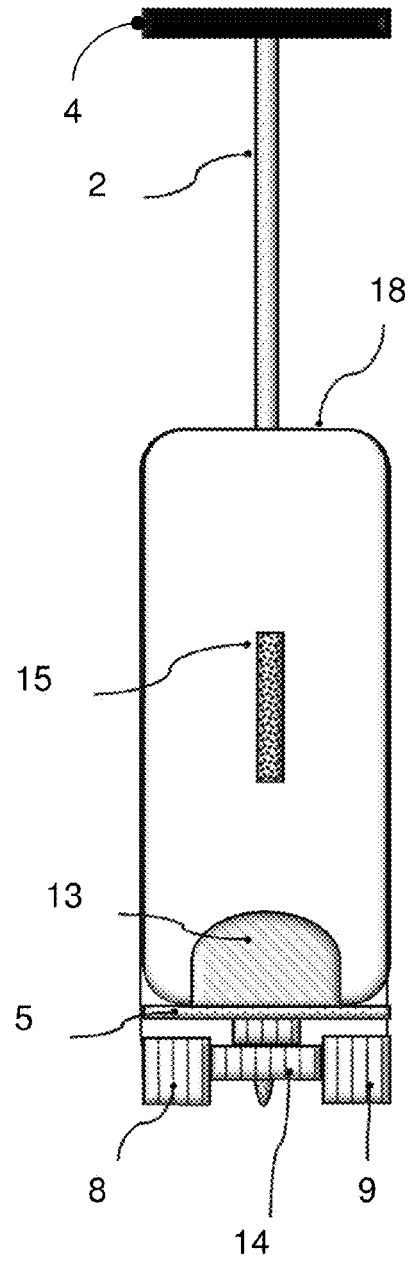

Reference Figure for Introduction

US 9,033,350 B2

LUGGAGE SCOOTER DEVICE

CROSS-REFERENCE TO RELATED APPLICATIONS

Invention was Granted a National patent from the IRISH PATENT OFFICE on the 8 Dec. 2011, with patent Number S.85929 after an Application filed on the 29 Jun. 2011 with Number S2011/0306 presented by the same inventor.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The invention relates to a bag/suitcase that can be used as a normal luggage or transformed into a skateboard and driven as a scooter while leaving the content in the suitcase.
Invention Solution
The invention deals with the problem of a traveler carrying luggage when moving around airports, train stations or elsewhere. The invention will help the traveler to move faster and with less effort.

BRIEF SUMMARY OF THE INVENTION

The invention, from now on called "Skate trolley", is a luggage that can be converted into a skateboard scooter. Skate-Trolley is built around an external frame made of carbon fiber, fiberglass, plastic, aluminum structure or any other material strong enough to hold a person weight.
To this structure all items and systems are connected, in order to make Skate trolley very light there is no internal frame, but the external frame itself acts as a structural frame. Skate trolley has a retractable Driving Stick that steers the front wheel, a retractable platform with wheels and a door so the inside of the suitcase can be accessed to store luggage. The traveler standing on the platform can ride the luggage rather than carry it. The traveler, using the combined effect of a scooter and of skateboard steering effect, can maneuver in a small spaces with a lot of obstacles such as those found in airports.

BRIEF DESCRIPTION OF THE SEVERAL VIEWS OF THE DRAWINGS

FIG. 1—Skate-Trolley seen from the side—the picture shows the driving stick (4) in the operational position and, in dotted lines, the closed position. The standing platform (5) can be seen in the operational position and in the closed position by dotted lines. The door (12) that opens the luggage is in the closed position. A drawing of a foot and of the hands in dotted lines shows the correct position to drive skate-trolley.

FIG. 2—Skate-Trolley seen from the back—the driving stick is in the operational position and the cavity area (13) where the front part of the foot can be placed while riding is visible. The rear wheels can be seen (8,9) connected to the pivoting axle (14).

FIG. 3—Skate-Trolley seen from the front—the driving stick is in the operational position and the dotted line shows the closed position. The front wheel can be seen (1) connected to the driving stick (2,4).

FIG. 4—Skate-Trolley seen from the top—with the standing platform (5) in the operational position.

DETAILED DESCRIPTION OF THE INVENTION

Figure 13:
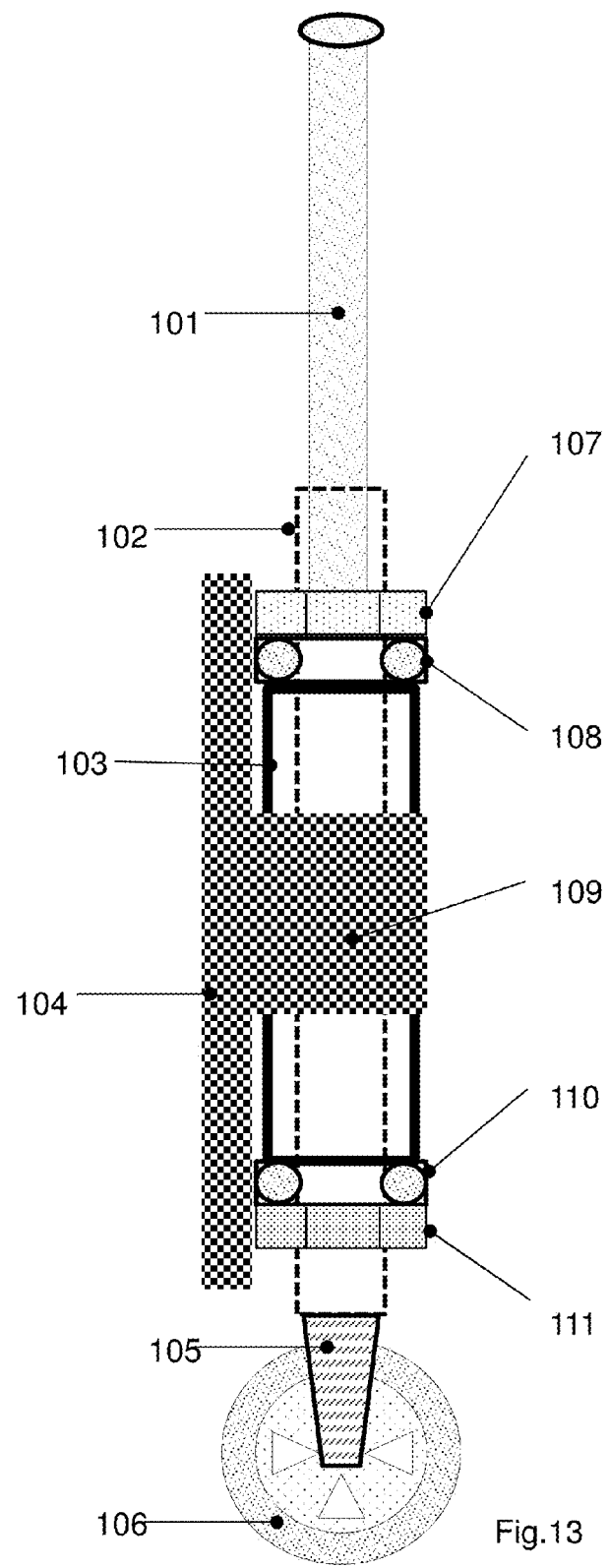
FIG. 13—The front driving mechanism of Skate-Trolley.

A detailed description is presented through the explanation of the major parts of the skate-trolley.
The External Frame
The external frame (18) of the Skate Trolley is made of any resistant and light material strong enough to hold a person weight. The external frame has the shape of a box to optimize loading and storing space. To the external frame all the following objects are attached to.
The Driving Stick (FIG. 13)
A tube (103, Tube1) made of light but resistant material (aluminum, carbon-fiber, plastic etc.) is attached to the front part of the external frame (104) at point (109). A second tube (102, Tube2) of the same material, slightly longer in size and of smaller diameter, is fitted inside this tube telescopically.
At both ends there are circular rollers (108,110) so that Tube2 can easily turn on its axis inside Tube1. At the bottom, underneath the roller, a fork (105) connects it to the front wheel (1,106). By steering this tube, the front wheel will steer.
Both rollers are blocked in place by a bolt (107,111) screwed on Tube2.
The driving stick (101, Tube3) shaped as a T, has a diameter slightly smaller of Tube2 (102), in such a way that it can be pulled telescopically in and out from it. A pin connected to a spring fitted inside the driving stick will lock it in the operational or closed position. The user will switch from one position to the other by pressing on the pin and unlocking it (not shown in the drawings).

Figure 14:
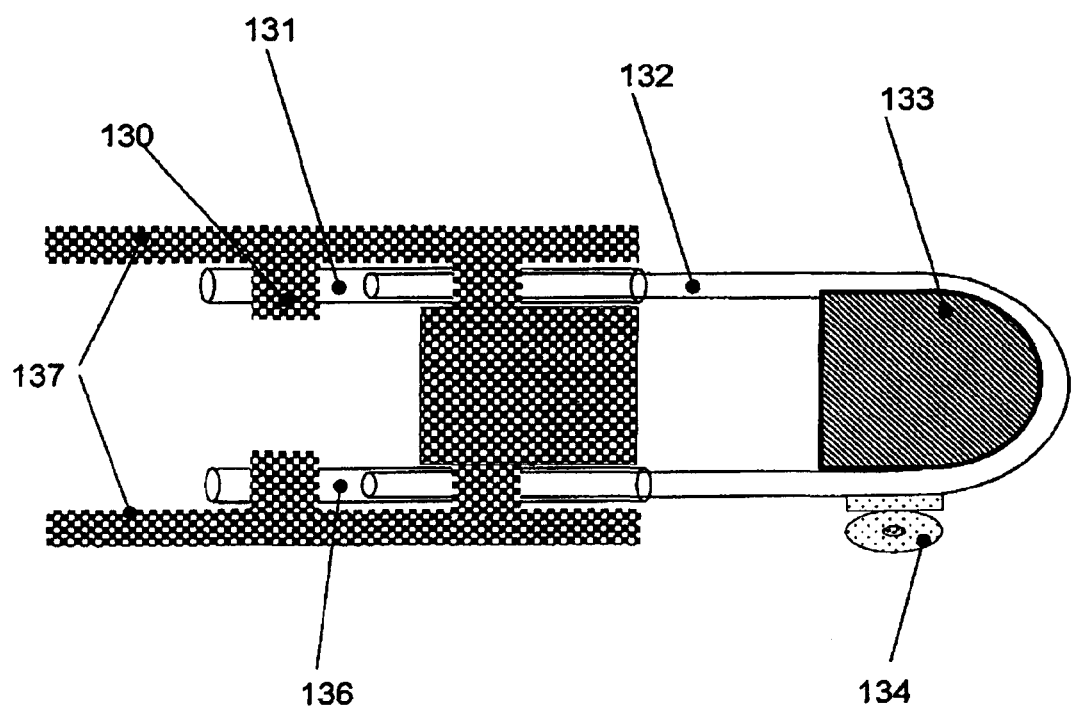
FIG. 14—The standing platform mechanism of Skate-Trolley.

The Standing Platform (FIG. 14)

Two tubes (131) Tube4 and (136) Tube5 made of light but resistant material (aluminum, carbon-fiber, plastic etc.) are attached to the external frame (137) of Skate-Trolley at point (130).

The standing platform (133) is connected to a U shaped lightweight tube (132) Tube6.

This U tube is of smaller diameter of the Tube4 and Tube5 and it will telescopically shift in and out of them. The standing platform has a skateboard like wheel system (134) attached to it.

Figure 15:
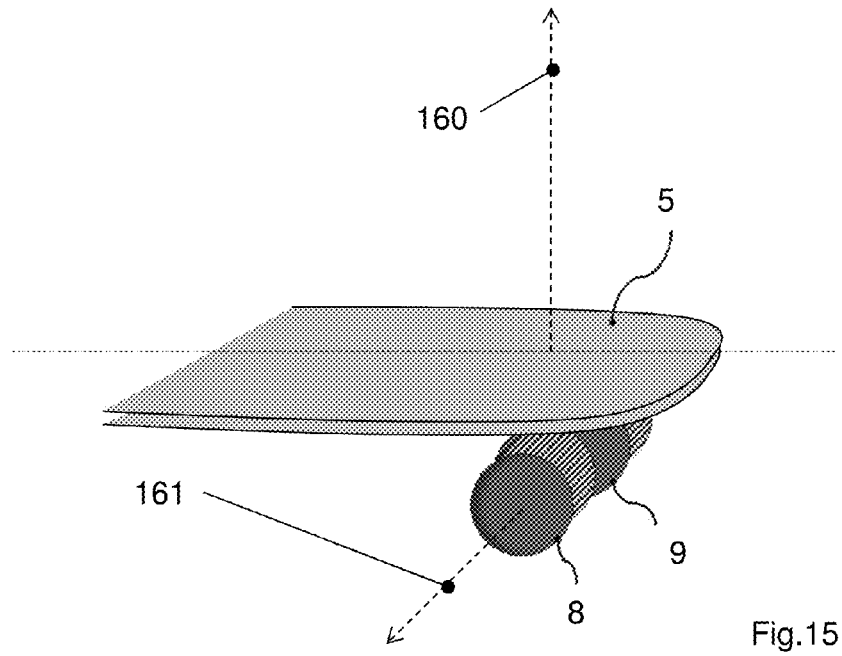
FIG. 15—The steering effect of the rear wheels, in a settled position. Note the imaginary vertical axis (160) and imaginary axle axis (161).
Figure 16:
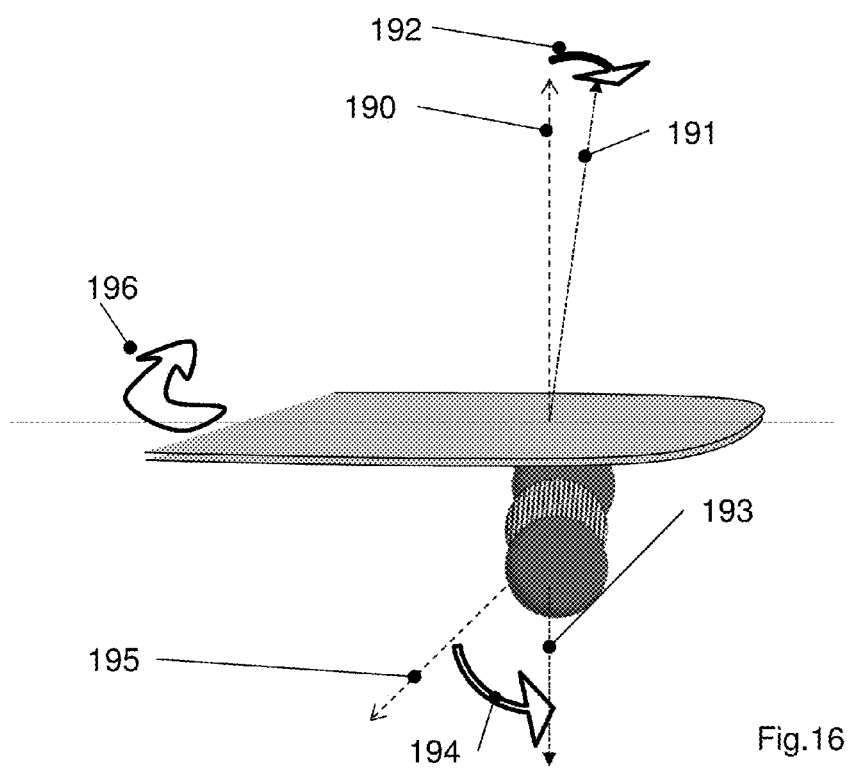
FIG. 16—The steering effect of the rear wheels, in the tilting position. Note the imaginary vertical axis in a settled position (190), the same imaginary axis after a tilting effect (191), also note the imaginary axle axis in a settled position (195) and the resulting imaginary axle axis (193) consequence of a tilting effect.

This rear wheel system has as pivoting axle (FIG. 2 14), connected to the two wheels (8,9), that can tilt in respect to the standing platform. While tilting the axle will also steer the wheels in the direction of the tilt in a skateboard manner (FIG. 15 and FIG. 16). Inside Tube6 there is a pin connected to a spring that will lock the standing platform in operational position (not shown in the drawings). The user will switch from one position to the other by pressing on the pin and unlocking it.

The Door

The door has two hinges (17) and a locking system (16) allowing it to be opened and closed.

The Handle

Skate-Trolley has a handle (15) attached to the external frame (by means of bolts or rivets) it so it can be carried in a standard suitcase like manner.

Invention Key Facts

The two following points together make the invention unique and particularly effective in the field of the application.

The Special Turning Effect

To help the user move efficiently in limited spaces, the Skate Trolley takes advantage of the combined effect of scooter and skateboard steering mechanisms. In other words, the driving stick (4) directly steers the front wheel (1) and enables the driver to steer while standing on the platform in a scooter manner. The rear wheels (8,9) behave in a skateboard like manner; the rear wheels axle (14) can gain an angle with respect to the platform letting the baggage tilt in respect of the ground (FIG. 16, angle of tilt 192); this consecutively will also make the rear wheels steer in the direction of the tilt (FIG. 16 angle of steering 194) and help the driver in turns. (FIG. 16 direction of the turn 196).

Skate Trolley has No Extra Scooter Frame

The Skate trolley is designed in such a way that there is no internal frame connecting the wheels, the driving stick and the standing platform. In other words, the external frame shell structure (18) itself represent the infrastructure of Skate-trolley, there is no need for a separate and heavy structure such as a scooter frame.

This is achieved by building an external frame (FIG. 13 and FIG. 14) that has a tube shaped hollow area where the Tube1 (103), Tube4 (131) and Tube5 (136) perfectly fit and are glued and blocked. The driving stick and the platform are connected to these tubes by means of telescopical solutions.

This design solution is key for the invention; it allows the Skate-Trolley to be very light and at the same time maximizes the space for the luggage inside the baggage.

Similar Projects

Follows a list of similar projects, all of them have differences from this invention.

Figure 5:
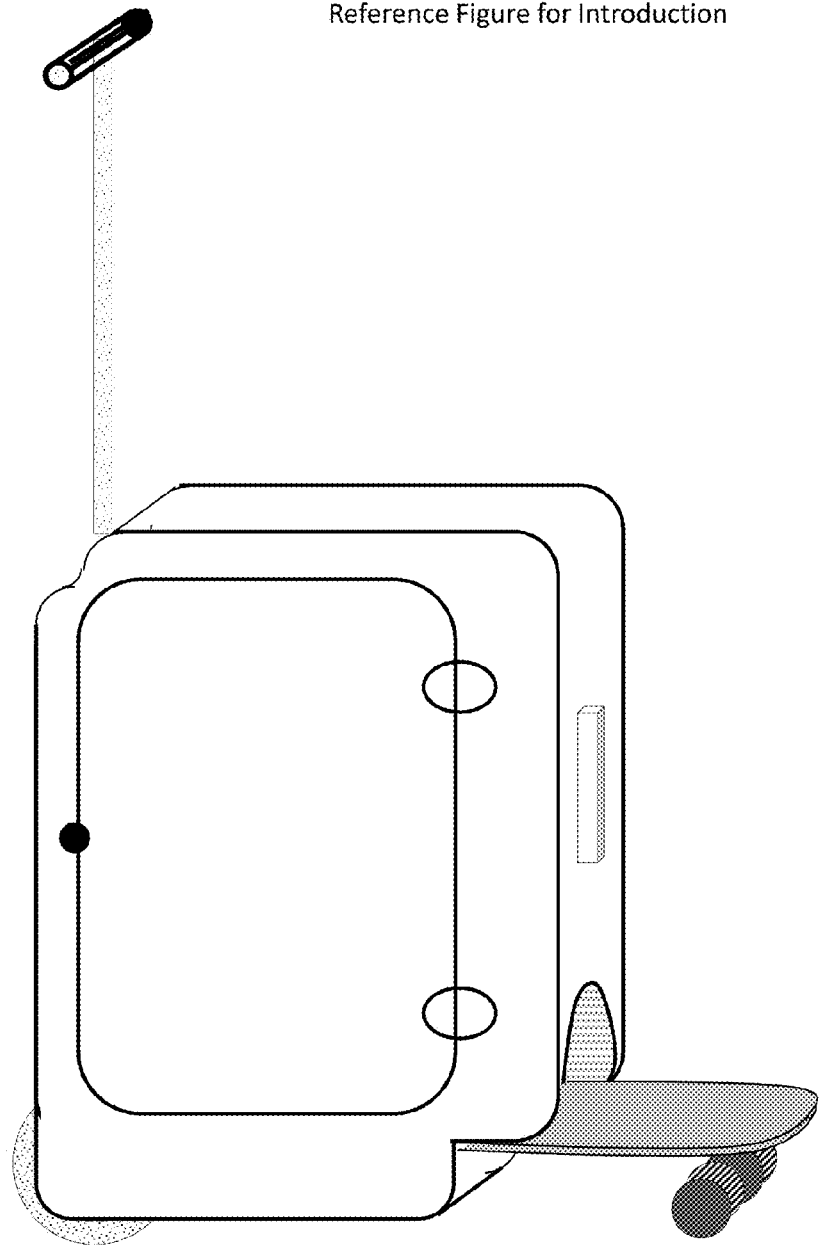
FIG. 5—Skate-Trolley seen in 3D perspective—with the driving stick (4) and the standing platform (5) in the operational position.
Figure 6:
FIG. 6—Skate-Trolley—with the driving stick and standing platform in the operational position ridden by user.
Figure 7:
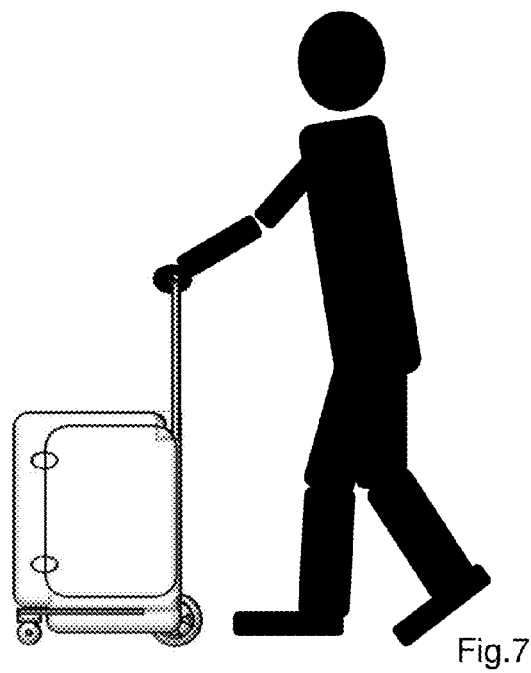
FIG. 7—Skate-Trolley—with the driving stick in the operational position and the standing platform in the closed position pushed by the user standing on all three wheels.
Figure 8:
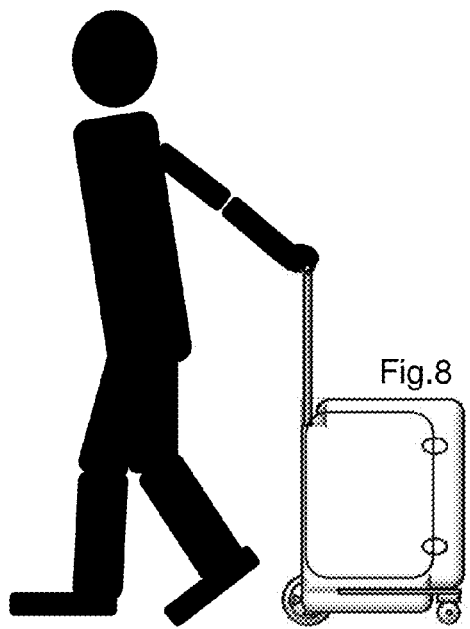
FIG. 8—Skate-Trolley—with the driving stick in the operational position and the standing platform in the closed position pulled by the user standing on all three wheels.
Figure 9:
FIG. 9—Skate-Trolley—with the driving stick in the operational position and the standing platform in the closed position pulled by the user in a trolley manner standing on just the rear wheels.
Figure 10:
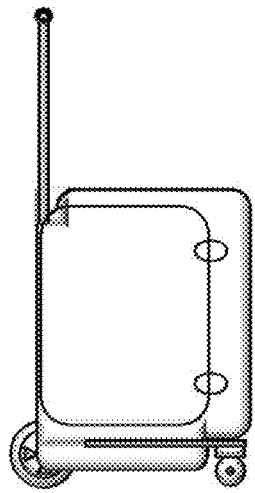
FIG. 10—Skate-Trolley—with the driving stick in the operational position and the standing platform in the closed position standing by itself on all three wheels.
Figure 11:
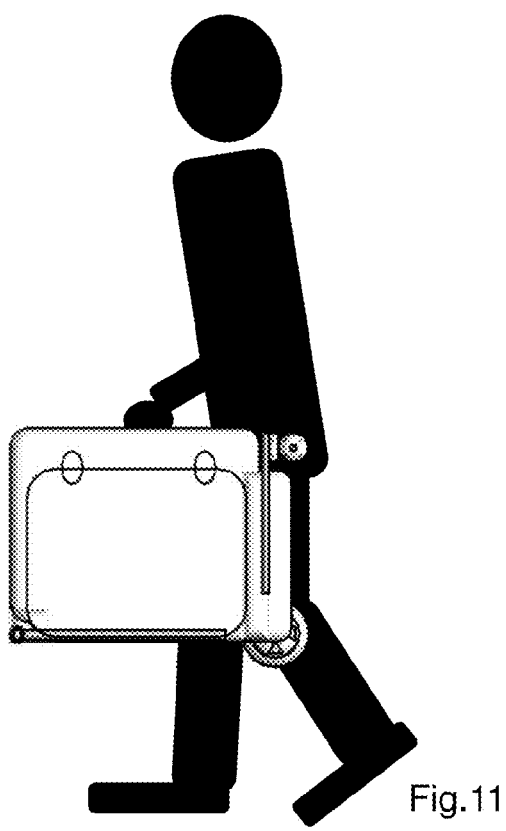
FIG. 11—Skate-Trolley—with both the driving stick and the standing platform in the closed position carried by the user from the handle.
Figure 12:
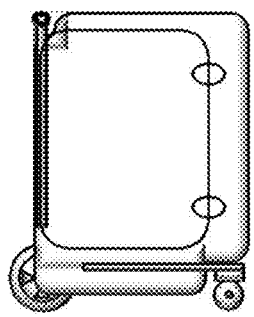
FIG. 12—Skate-Trolley—with both the driving stick and the standing platform in the closed position ready to be stowed.

USD268938 May 10, 1983
Has only one back wheel.
Does not uses the skate-board type steering effect
Platform and wheels are not pulled out telescopically from baggage shape
Does not have a T shape driving stick
There is no steering mechanism
US2009/0315301 Dec. 24, 2009
Has only one back wheel.
Does not uses the skate-board type steering effect
Platform and wheels are not pulled out telescopically from baggage shape
There is no steering mechanism
WO2004/012984 Feb. 12, 2004
Has only one back wheel.
Does not uses the skate-board type steering effect
Platform and wheels are not pulled out telescopically from baggage shape
Baggage is made of soft material
Baggage is build around a scooter frame
US2004/0094919 May 20, 2004
Has only one back wheel.
Does not uses the skate-board type steering effect
Platform and wheels are not pulled out telescopically from baggage shape
Baggage does not stand up by itself (version with 2 wheels)
Baggage is ridden sideways (version with 3 wheels)
WO2004/093595 Nov. 4, 2004
Has only one back wheel.
Does not uses the skate-board type steering effect
Platform and wheels are not pulled out telescopically from baggage shape
Baggage does not stand up by itself
Baggage is build around a scooter frame
U.S. Pat. No. 4,145,065 Mar. 20, 1979
Does not uses the skate-board type steering effect
Platform and wheels are not pulled out telescopically from baggage shape
Does not have a T shape driving stick
Steering is achieved through a pivot point
Not box shaped.
U.S. Pat. No. 3,314,494 Apr. 18, 1967
Does not uses the skate-board type steering effect
Platform and wheels are not pulled out telescopically from baggage shape
Does not have a T shape driving stick
There is no steering mechanism
Baggage is ridden sideways
U.S. Pat. No. 3,413,011 Nov. 26, 1968
Does not uses the skate-board type steering effect
Platform and wheels are not pulled out telescopically from baggage shape
Does not have a T shape driving stick
There is no steering mechanism
Baggage is ridden sideways
US2004/0056442 Mar. 25, 2004
Does not uses the skate-board type steering effect
Platform and wheels are not pulled out telescopically from baggage shape
Standing platform is build of a complex structure that reduces the volume for luggage.
U.S. Pat. No. 7,731,204 Jun. 8, 2010
Has only one back wheel.
Does not uses the skate-board type steering effect Platform and wheels are not pulled out telescopically from baggage shape
Baggage is made of soft material
Baggage is build around a scooter frame
Baggage does not stand up by itself
EP1138590 Apr. 10, 2001
Has only one back wheel.
Does not uses the skate-board type steering effect
Baggage does not stand up by itself
Standing platform is made out of three telescopic segments, which makes system unstable under a person weight.
WO03/045185 of Jun. 5, 2003
Has only one back wheel.
Does not uses the skate-board type steering effect
Platform and wheels are not pulled out telescopically from baggage shape
Baggage is build around a scooter frame
Baggage is ridden sideways
Turning is achieved through a pivot point and not by the T bar turning the wheels.
U.S. Pat. No. 7,431,311 of Oct. 7, 2008
Has only one back wheel.
Does not uses the skate-board type steering effect
Wheels are not pulled out telescopically from baggage shape
Baggage is build around a scooter frame
Baggage is ridden sideways
Baggage is made of soft material
US2010/0213680 of Aug. 26, 2008
Has only one back wheel.
Does not uses the skate-board type steering effect
Platform and wheels are not pulled out telescopically from baggage shape
Baggage is build around a scooter frame
Baggage is ridden sideways
WO03/093093 of Nov. 13, 2003
Has only one back wheel.
Does not uses the skate-board type steering effect
Platform and wheels are not pulled out telescopically from baggage shape
Baggage is build around a scooter frame
It can only be used as a baggage if not ridden.
WO2010/094824 of Aug. 26, 2010
Does not uses the skate-board type steering effect
Front wheel is pulled out telescopically from baggage shape rather than the rear wheel
Baggage is build around a scooter frame
Bag is placed behind rider foot instead of in front
WO03/045185 of Jun. 5, 2003
Has only one back wheel.
Does not uses the skate-board type steering effect
Platform and wheels are not pulled out telescopically from baggage shape
Baggage is build around a scooter frame
Baggage is ridden sideways
PCT FR01/02556 of Sep. 17, 2001
Has only one back wheel.
Does not uses the skate-board type steering effect
Platform and wheels are not pulled out telescopically from baggage shape
Baggage is build around a scooter frame
Baggage is made of soft material Summary Skate trolley is designed in such a way that:
it is a device for storing luggage that can be converted and be ridden as skateboard and driven like a scooter;
it has three rollers that maintain the baggage up straight in a standing position (FIG. 10);
it has one of the roller (1, front) that can be rotated on his vertical axis by means of the driving stick (2);
it has two other rollers (8,9) connected to the standing platform (5) that steer as the platform tilts in the typical skateboarding turning effect (FIG. 15);
it has pins that can lock into operational position the standing platform (5) and the driving stick (2);
it has a door (12) so the inside of the baggage can be accessed;
it has a cavity area (13) to allow the user to place the front part of the foot in this zone while the heel can be placed over the standing platform (5) in the operational position;
it has a handle so it can be carried as a standard luggage (FIG. 11);
both the driving stick (2,4) and the standing platform (5) can be moved in a closed position in order to be included in a box like shaped formed by the baggage (FIG. 12);
the user can stand on the platform (FIG. 8) with one foot, steering through the driving stick while pushing with the other foot to gain speed;
the device can pushed (FIG. 7) and pulled (FIG. 8) from the driving stick (2) to be moved around while standing up on the three wheels;
the device can also be used in a trolley like manner (FIG. 9) by rolling and carrying the luggage from the driving stick (4) in such a way that only the rear wheels (8,9) touch the ground;
there is no internal frame connecting the driving stick to the standing platform, the external frame shell structure itself acts as the infrastructure of Skate-trolley;
it uses the combined steering effect of a Scooter through the driving stick and of a Skateboard through its pivoting rear wheels axle under the platform to ease turns (FIG. 15);
it can be built in different sizes, one of which is designed to fit the carry-on regulations of air travel;
the front and driving wheel (1) can be substituted by two parallel wheels steering together as an option to increase stability.

The invention claimed is:
1. A luggage device with wheels convertible to a skateboard scooter that can be ridden comprising:
an external frame comprising a container for storing luggage, said container includes a door with hinges and a closing mechanism;
at least one front wheel rotatably connected to said external frame;
a driving stick that can be telescopically pulled out in a vertical manner from said external frame, said driving stick being connected to said at least one front wheel through a fork so that said at least one front wheel can be steered;
a standing platform shaped as a skateboard platform that can be telescopically pulled out in a horizontal manner from said external frame;
two rear wheels rotatably connected to said standing platform;
a skateboard axle mechanism that is attached to said standing platform and is rotatably connected to said rear wheels, said skateboard axle mechanism comprising tilting elements adapted to steer said two rear wheels in the direction of the tilt;
a handle mechanism attached to said external frame;

a cavity area located in said external frame above said standing platform;

a locking mechanism adapted to lock said driving stick in operational position;

a second locking mechanism for locking said standing platform in operational position.

2. A luggage device as claimed in claim 1 comprising two parallel wheels attached to said driving stick for increased stability.

3. A luggage device as claimed in claim 1 or claim 2 wherein said at least one front wheel and said pair of rear wheels are adapted to maintain said luggage device in a straight up standing position; with said driving stick in operational position said luggage device can be pushed and pulled while standing.

4. A method of using a luggage device as claimed in claim 1, comprising:

pulling out said driving stick vertically into operational position;

pulling out said standing platform horizontally into operational position;

placing one foot over said standing platform and inside the cavity area;

instigating movement of said luggage device by pushing away with the alternative foot in a skateboard moving manner;

alternating direction using
said driving stick in a scooter manner,
or by tilting said luggage device around said skateboard axle mechanism,
or by the combined effect of the two actions to achieve maximum results.

\* \* \* \* \*